United States Patent
Foster

[11] 3,843,155
[45] Oct. 22, 1974

[54] MOTOR VEHICLES INCORPORATING MEANS FOR PROTECTING THE OCCUPANTS IN THE EVENT OF COLLISION ACCIDENTS

[75] Inventor: David Blythe Foster, Windlesham, England

[73] Assignee: Science Nightingale International Limited, Hamilton, Bermuda

[22] Filed: Aug. 31, 1971

[21] Appl. No.: 176,648

Related U.S. Application Data

[63] Continuation-in-part of Ser. No. 859,752, Sept. 22, 1969, abandoned.

[30] Foreign Application Priority Data

| Sept. 27, 1968 | Great Britain | 46129/68 |
| Nov. 8, 1968 | Great Britain | 53173/68 |
| Apr. 9, 1969 | Great Britain | 18190/69 |
| Apr. 30, 1969 | Great Britain | 22142/69 |
| May 20, 1969 | Great Britain | 25641/69 |
| May 28, 1969 | Great Britain | 27111/69 |
| May 28, 1969 | Great Britain | 27112/69 |
| June 16, 1969 | Great Britain | 30465/69 |
| May 29, 1969 | Great Britain | 27366/69 |

[52] U.S. Cl. ......................... 280/150 B, 296/65 A
[51] Int. Cl. .......................................... B60r 21/04
[58] Field of Search ............... 280/150 B, 150 AB; 296/65 C, 84 K; 180/90; 297/216

[56] References Cited
UNITED STATES PATENTS

| 3,224,924 | 12/1965 | Von Ardenne | 180/90 X |
| 3,262,716 | 9/1966 | Graham | 280/150 B |
| 3,439,769 | 4/1969 | Brilmyer | 180/90 |
| 3,468,556 | 9/1969 | Smith | 280/150 B |

FOREIGN PATENTS OR APPLICATIONS

| 953,313 | 3/1964 | Great Britain | 280/150 AB |

Primary Examiner—David Schonberg
Assistant Examiner—John A. Pekar
Attorney, Agent, or Firm—Brisebois & Kruger

[57] ABSTRACT

This invention relates to the incorporation of means in motor vehicles for protecting the occupants as a result of collisions. Paddings are provided in front of the occupant and these are so shaped as to conform to the human lateral profile in the natural long-jump or broad jump posture. Moreover, the paddings have a horizontal top area for impact by the head, face and upper chest, a central rounded rearwardly projecting area for impact by the lower chest and abdomen and a first underneath substantially horizontal area for contact by the thighs and a sloping downwards area for contact by the lower legs. The front to back dimension of the horizontal top area is such that the occupant's head cannot reach the windscreen when his upper torso and head is resting on the said area.

26 Claims, 15 Drawing Figures

PATENTED OCT 22 1974  3,843,155
SHEET 2 OF 6

MOTOR VEHICLES INCORPORATING MEANS FOR PROTECTING THE OCCUPANTS IN THE EVENT OF COLLISION ACCIDENTS

This application is a Continuation-in-Part of my Application No. 859,752 dated Sept. 22, 1969, now abandoned, entitled "Motor Vehicles incorporating means for protecting the occupants in the event of collision accidents."

The present invention relates to motor vehicles and particularly to the incorporation of means therein for protecting the occupants on gross retardation of the vehicle due to accidents involving collision, particularly head-on collision, with stationary objects or other vehicles.

Whilst the present invention may be particularly associated with motor vehicles as set forth in the aforementioned application, it should be clearly understood that it is applicable to motor vehicles of any desired configuration. Thus, for example, whilst the invention can be considered as refining the concept of padded vehicle interiors as shown in FIG. 3 of the aforementioned Specification so as to meet already established medical standards capable of quantitative evaluation, it may also be adapted to meet standards which are yet to be established.

It is an object of the invention to provide interior padding for a vehicle which shall eliminate or substantially reduce injuries to the occupants when the vehicle is involved in a substantially frontal collision which halts or grossly retards the vehicle but permits the occupants to continue to move forwards and strike the internal surfaces of the vehicle in the so-called "second collision". It is a further object to establish a system which is primarily designed to be effective without other means of restraint, although the effect of such other means, such as the wearing of seat belts, would be to reduce the severity of the second collision compared with the primary collision of the vehicle with an external object, whether the latter is stationary or moving.

It is yet a further object of the invention to apply a number of distinct principles relating to the fact that, at second collision, the injury to the occupants can be reduced or eliminated by the following considerations:

1. The extent to which stopping paddings are contoured to contact the maximum human body area when the human body is in a natural articulated posture similar to, if not identical with, that which the body had when seated before a collision.
2. The extent to which the known facts of human injury-free tolerance can be designed into the system, both as to the human body as a whole, and as to the various zones of the human body treated relatively separately.
3. The design of the paddings to eliminate injury to small outstanding projections such as the nose and kneecaps and the bridging over particularly vulnerable organs, such as the eyes.
4. The design of the paddings to reduce retardation values, reduce area pressures, reduce total forces and reduce bone stresses.
5. The design of a padding system so that the effectiveness of the system is not by-passed by the interference of other features of the vehicle and particularly the windscreen and the steering system.

With these and other objects in view, the invention consists in a motor vehicle whose interior is provided with paddings in front of the occupants, which paddings are so shaped as to conform to the human lateral profile in the natural long-jump posture, said paddings having a relatively horizontal top area for impact by the head, face and upper chest, a central rounded rearwardly-projecting area for impact by the lower chest and abdomen and a first underneath area substantially horizontal for contact by the thighs and a sloping downwards area for contact by the lower legs.

The dimension of said relatively horizontal top area, rearwardly from the vehicle windscreen, that the occupants' head cannot reach the windscreen when his upper torso and head is resting on said area.

In carrying the invention into effect, a major part of said paddings comprises a lap bench in front of the occupants behind the windscreen, said lap bench having a dimension from front to rear which is sufficient to prevent the occupant's head impinging against the windscreen in the event of the upper torso folding over the lap bench on collision impact.

In order that the invention may be more clearly understood, reference will now be made to the accompanying drawings showing certain embodiments thereof by way of example, and in which.

Figure 3:
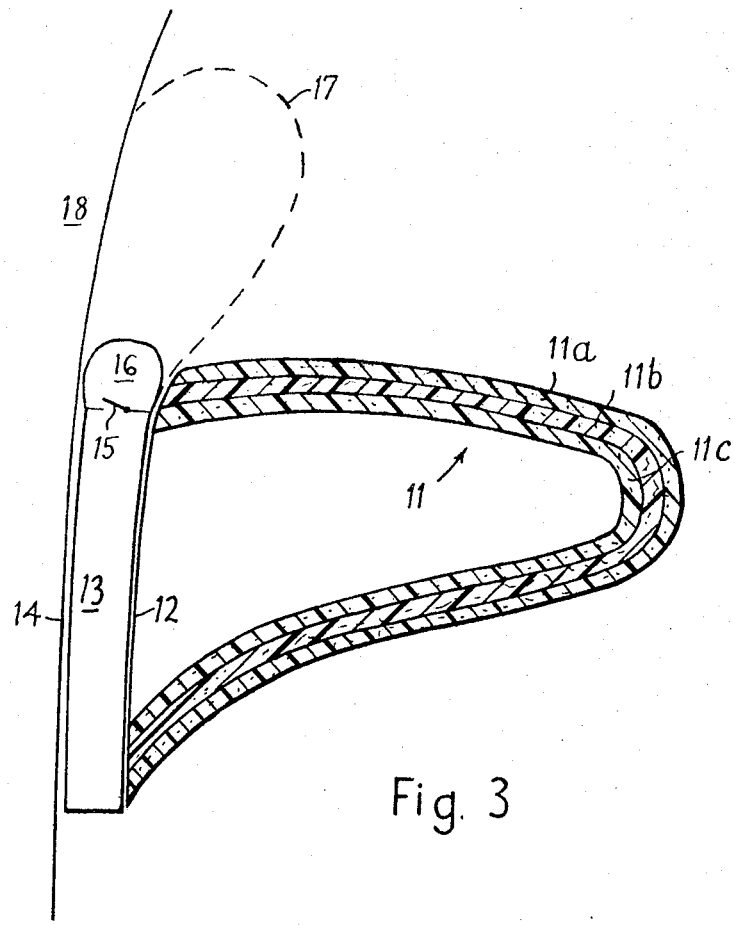
Figure 4:
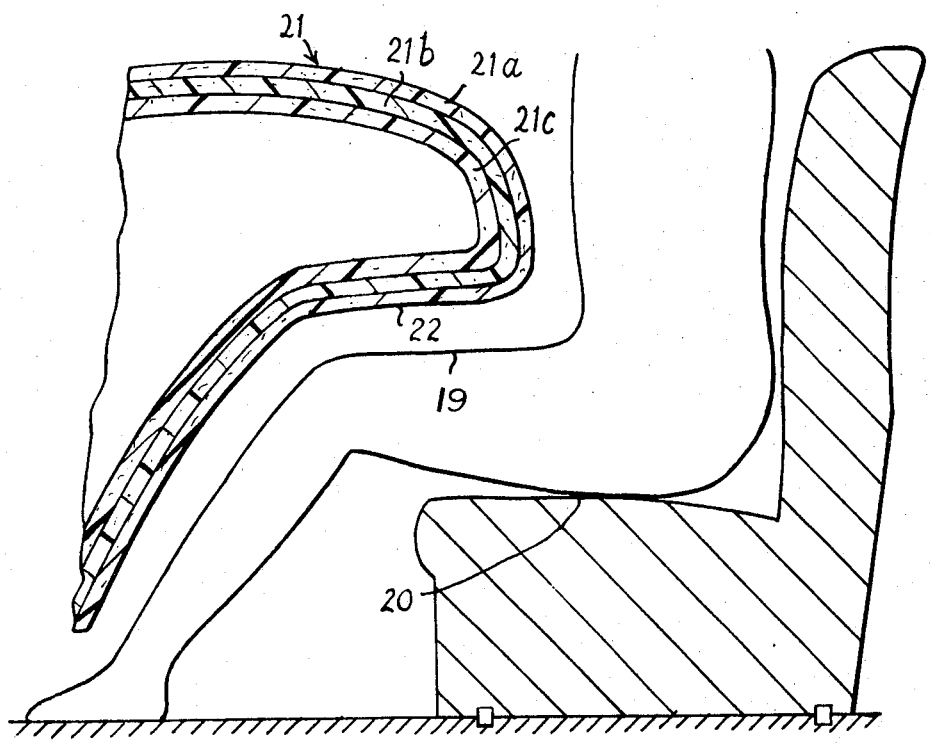
Figure 5:
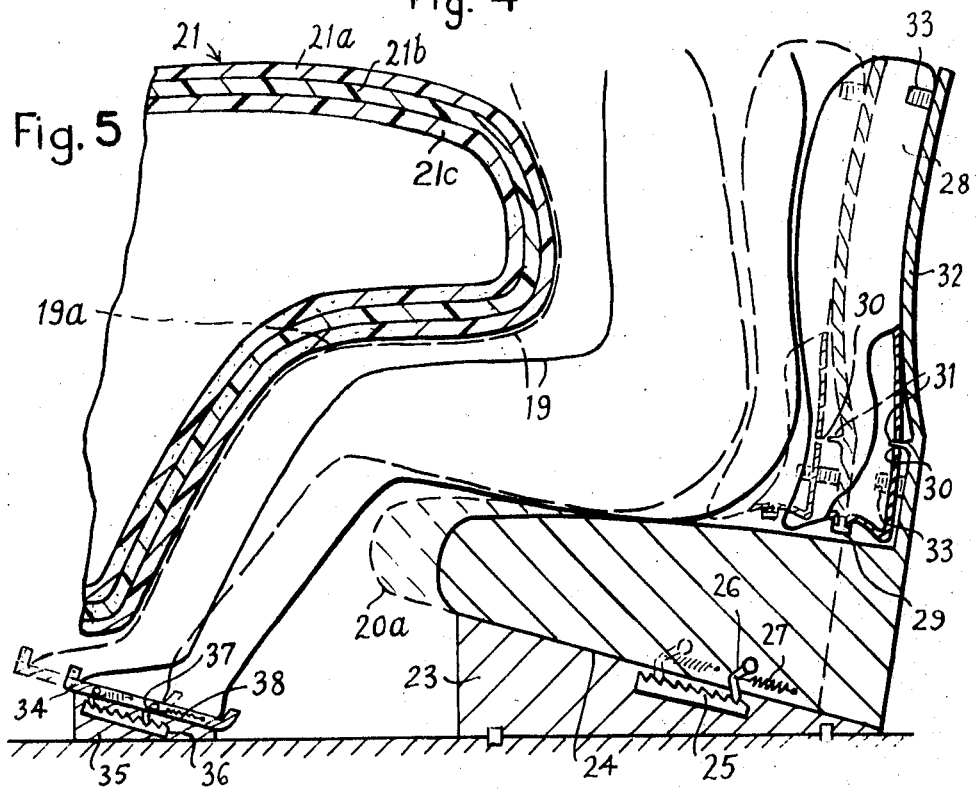
Figure 6:
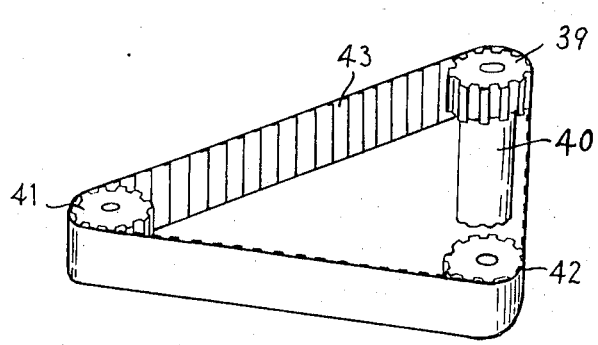
Figure 7:
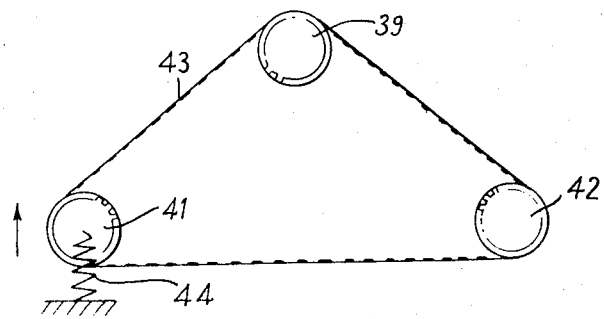
Figure 8:
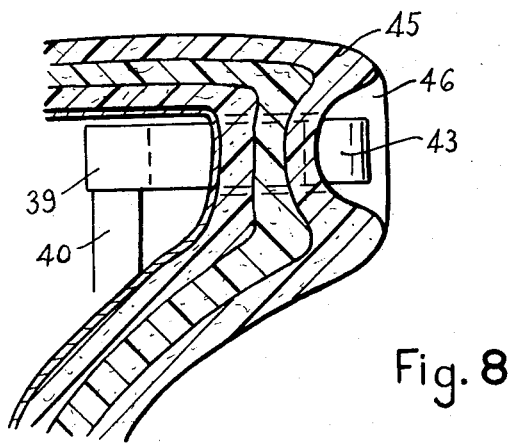
Figure 9:
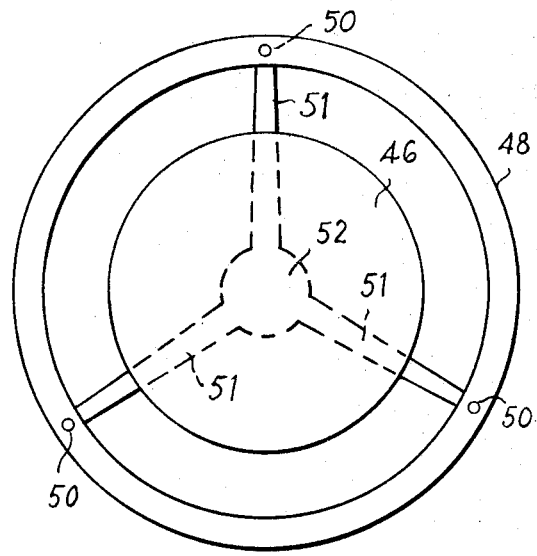
Figure 10:
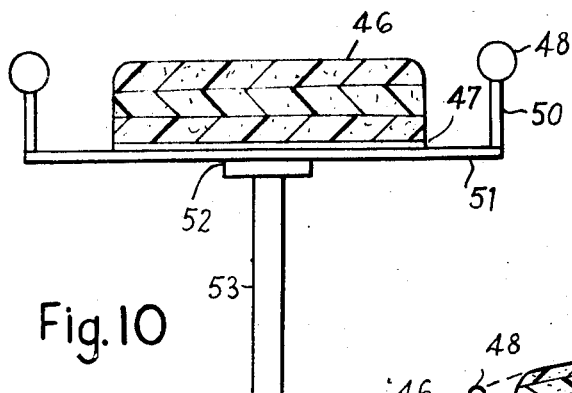
Figure 11:
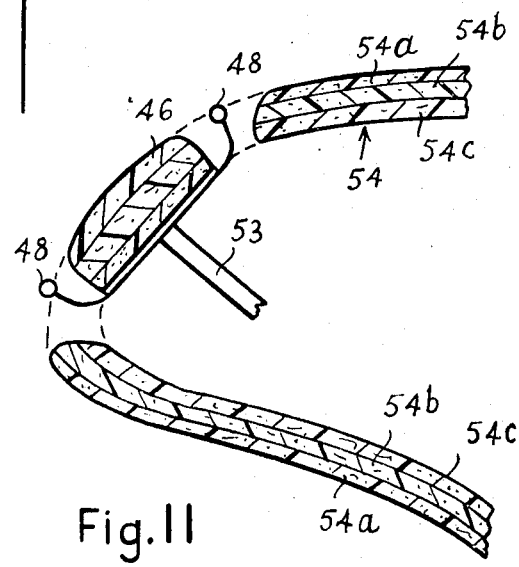

FIG. 3 shows a sectional view of protective devices movable into protective location on impact, FIGS. 4 and 5 show explanatory views of a seat and foot-rest fitted with a rising wedge action, FIGS. 6 to 8 show views of a steering device to replace a conventional steering wheel, FIGS. 9 to 11 show views of a padding construction for an otherwise conventional steering wheel, FIGS. 12 to 15 show views of various add-on units embodying protective padding.

Since the invention is partly quantitative in its relationship to design within injury-free parameters, the following values have been chosen as illustrative of fundamental facts about the typical human body but the actual values given may be varied without affecting the invention.

The following are the chosen medical facts as to injury-free tolerance of the human body:

TABLE 1

Permissible peak retardation (head) — 30G
Permissible peak retardation (rest of body) — 50G Permissible area pressure (general) — 160 lbs. per sq. in.
Permissible force on each eyeball apart from retardation inertia forces — 5 lbs.
Permissible force on the nose — 50 lbs.
Permissible maximum bone stress in "worst case" (tension) — 1,000 lbs. per sq. in.
Permissible maximum force of femur via thigh bone — 1,400 lbs. per sq. in.

The following are relevant facts concerning the masses and areas of the typical adult human body: The body is divided into parts separated by major hinging joints:

TABLE 2

| Body Part | Projected Frontal Area in sq. inches | Articulated Mass in lbs. |
|---|---|---|
| Head | 40 | 15 |
| Trunk | 360 | 75 |
| Upper arm | 45 | 5 |
| Lower arm | 45 | 5 |
| Thigh | 90 | 15 |
| Lower leg | 90 | 10 |

In designing a padding system on scientific-medical principle to be injury-free, it is necessary to specify the vehicle crash and we assume the following as typical:

A direct frontal collision at 30 m.p.h. into an immovable object the frontal crushing characteristics of the vehicle and the distance of the occupant from paddings being such that the second collision will occur at 15 m.p.h. and with such second collision value being assumed after any effects allowable for seat-belt or similar restraint or semi-restraint. This will be referred to as "The Standard Crash."

The human being is designed as an articulated system capable of taking injury-free shocks due to falls or jumps in a hostile gravitational field and the maximum shocks can be resisted when the body lands feet first and when the articulated joints such as ankle, knee, hip, spine and neck partially flex under damping restraint from the associated muscles. The maximum injury-free impact can be sustained when each part of the body makes a contribution according to the capability of its local system within a total system capability.

Thus, a human being can typically jump from a height of ten feet onto turf without injury whereas, if a human being drops from two inches onto his skull on hard ground, he can be fatally injured. Thus, in principle, there is a wide variation in the ability of the human body to systain impact without injury according to the posture of the body at impact. When this principle is applied to a person subject to forward collision in a vehicle, then before the collision he was seated in a posture very similar to that of athletes in longjump competitions and the invention ensures that the vehicle occupant impacts into paddings in the "Long-Jump" or "Broad Jump Posture," i.e., jumping in a generally horizontal direction.

Figure 1:
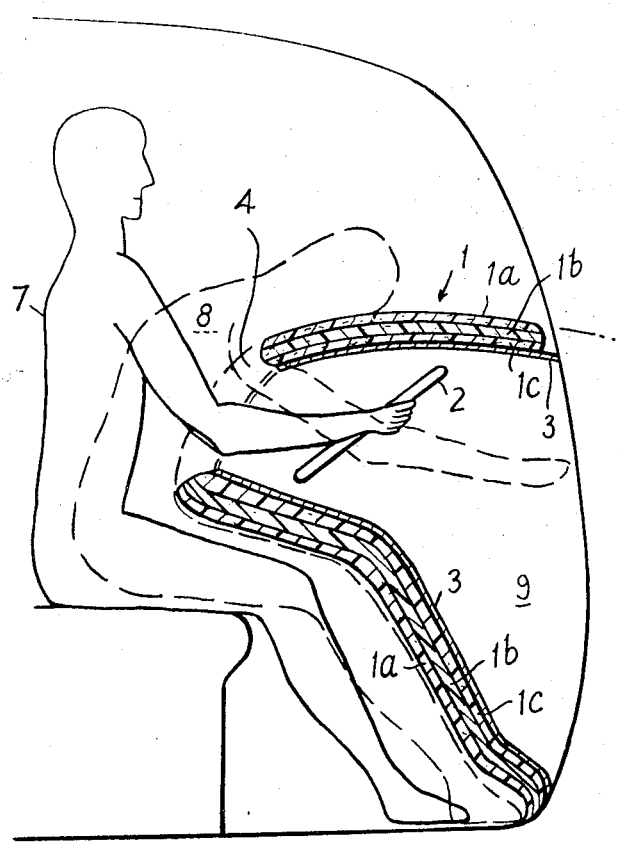
FIG. 1 shows an explanatory view of the use of a steering wheel shroud.

The long-jump landing posture differs from that of the vertical jump landing posture in that the head and trunk are bent forwards to counterbalance the forward thrust of the lower limbs and we refer now to the drawings, wherein at 1 of FIG. 1 is shown a padded lap bench and it will be seen that the passenger seated before the collision at 7 is thrown forwards by the collision retardation to fold naturally round the padded bench as shown at 8. The paddings follow the frontal outlines of the body and thus contact all the main features thereof. These paddings may thus be described as Total Profile Paddings and to accommodate an average body length, the minimum profile developed length would be about 65 inches on the padding system. The padding extends substantially over the width of the car to allow for variations of collision from the true frontal.

Furthermore, it is essential that the head of the occupant does not touch the windscreen when striking and folding over the lap bench 1 and thus the distance between the rearmost point of the paddings at 4 of FIG. 1 should not be less than thirty inches from the windscreen when measured along the upper area of the padding. The system as thus described is appropriate to any or all vehicle seating positions, and whilst it should be of eighteen inches minimum width to allow for collisions either side of straight frontal, in practice it should extend substantially across the whole width of the vehicle in front of the occupants.

Experimental work has shown, and as will be described later, that not less than about 2 or 3 inches thickness of shock-absorbing cushioning on the bench 1, which also shrouds the steering wheel 2, and is mounted on a rigid or semi-rigid shaped frame 3, is sufficient to take human bodily impact including the skull without causing fracture. Whilst the padding 1 may be a multi-functional single layer, it may alternatively comprise three different layers 1a, b, c, exhibiting the same stiffness characteristics as in the single layer padding. Alternatively again, the padding 1 may be of two-layer construction, if it is found possible to provide the three essential functions in only two layers. The frame 3 is representative and effectively may be any part of the vehicle providing the fourth function. This arrangement enables the lap bench to be hollow and to be provided with entry apertures or armholes 4 permitting the fitting of a conventionally positioned steering wheel and thereby the driver can hold the wheel in normal fashion for steering purposes whilst fully protected by the bench, and in particular by the presence of the cushioning at 5 taking the thrust in collision of the abdomen and chest, and of the area 6 taking the thrust of the occupant's shoulders.

In a collision the normal posture of the driver 7 converts to the dotted posture 8 as referred to above, with the arms being thrown forwards into the buffer cavity 9.

Reference numeral 10 indicates a panel for the controls of the vehicle such as ignition and light switches and this is protected by a padded wall 11 to prevent injury to the hands, the instrument controls being thus recessed within the padding.

Thus, by this means a relatively conventional steering wheel and instrument control assembly can be retained whilst protecting the driver in a collision from contact with them.

It will be appreciated that the design permits various modifications to give the optimum contour of the buffer related to its cushioning functions and thus, for example, the area 5 can be moulded with a concave shape to conform with the substantially barrel shape of the driver's chest.

Following a series of experimental tests, an advantageous system of cushioning materials, for example, as applicable to the buffer, has now been derived, as follows. In the study of vehicle injuries to the human body, it is well established that the human skull is the most fragile part of the body and thus, if a satisfactory cushioning technique can be established to prevent skull injury then the general application of this technique will probably suffice to protect other parts of the human body.

A simulated model of the human skull was made by taking glass globes of 8 inches diameter and of 1 mm. wall thickness and filling these with a mixture of water, gelatine and sand to simulate the weight of the human head at about 10 lbs. This head form is similar to that described under Section S3.1 of page 19721 of U.S. Federal Register Volume 33, No. 250.

Such a simulated skull will shatter if dropped ½ inch onto a hard surface such as concrete and appears to be considerably more fragile than the human skull.

This simulated skull was dropped from increasing heights onto different arrangements of cushioning materials and a preferred arrangement was discovered which would withstand a drop of eighty inches into three inches of materials with a cushion deformation estimated at 1 ½ inches and thus corresponding to a retardation of about 45G, where G is the normal gravitational constant of 32 feet per second per second. This result is better than other limitations of the human body to withstand shock and thus a three inch thickness of cushioning is suggested which would prevent the skull being fractured.

One preferred arrangement consists of the 3 1-inch thicknesses of a foamed isocyanate material of increasing stiffness with the softest layer 1a on the outside or impact side and this arrangement has unusual properties which prevent bounce-back of a heavy object on impact. Experiment has shown that a 1-inch bounce-back on a fall of 80 inches is typical. It is considered that this lack of bounce-back is due to the 3 layers having different stiffnesses or natural spring rates and thus these different rates interfere with each other to prevent them acting as a single resilient body capable of absorbing and then giving out energy at a single defined moment and thus causing bounce-back.

Equivalent results have been obtained both with single and composite layers of materials when one or more of these materials incorporates resistance dissipative characteristics well established in the synthetic plastics art, a typical such material being foamed polyurethane.

The limitation of paddings to protect from injury and particularly from concussive injury are established by the so-called Patrick Curve and as set out in Mr. Lawrence Patrick's paper "Human tolerance to impact — basis for safety design" described in the Society of Automotive Engineers Paper No. 1003B. This curve establishes maximum permissible impact G values with associated duration times and typical points are:

| G value | Duration time in Milliseconds |
|---------|-------------------------------|
| 150     | 3                             |
| 125     | 4                             |
| 100     | 5                             |
| 75      | 10                            |
| 50      | 30                            |
| 45      | Unlimited                     |

The system described implies that occupants of motor vehicles will be thrown against the paddings in a collision and the human body will suffer sharp retardation against them and from the Patrick Curve it will be clear that it is essential that impact values and durations shall not exceed the values typified in the above table.

Furthermore, it is essential that the human body should not suffer whiplash or bounce-back effects on striking the paddings which would augment the retardation forces and durations.

Most padding materials have an adverse characteristic for this purpose in that their resistance characteristic approximates to that of a spring since the resistance tends to be proportional to the depth of penetration and this means that the resistance is highest on maximum penetration. Since the equation of motion and force balance for retardation is expressed by:

$$R = M \times r$$

where $R$ is the resistance of padding, $M$ is the mass of the human body contacting the padding, and $r$ is the retardation of the mass, then it is clear that such padding systems create a rising retardation which has a peak at full penetration and thus the peak retardation values are higher than they need have been if the retardation had been of constant or near constant value. Such a constant or near constant retardation can be secured by the use of paddings having a resistance dissipative characteristic which is independent of depth of penetration and by this means peak retardations can be approximately halved compared with a padding system whose resistive characteristic is proportional to penetration.

In accordance with the invention, padding materials are used for this purpose which have a constant resistive characteristic or a characteristic which is more constant than the linearly increasing resistive characteristics referred to as being potentially more injurious.

A typical such material is rigidly foamed isocyanate as referred to above, and the following table gives typical figures for resistance against a cylindrical object of 1″ diameter when penetrating such a material:

| Depth of Penetration | Resistive Force |
|----------------------|-----------------|
| 0.25″                | 23 lbs.         |
| 0.50″                | 25 lbs.         |
| 1.0″                 | 32 lbs.         |
| 1.5″                 | 33 lbs.         |
| 2.0″                 | 34 lbs.         |

Thus, as between the penetration of 0.25 inch and 2.0 inches, there is a force increase ratio of only 1.48, whereas with a material of linearly increasing characteristic, there would have been a force increase ratio of 8.0 times.

For equivalence of total dissipative stopping work with the two alternative systems, it can be shown that the peak retardation using the almost constant resistive system as typified above, would only be about 55 percent of that using a conventional padding arrangement having a linearly increasing resistive characteristic with penetration depth.

This highly desirable relatively constant resistive characteristic to give corresponding relatively constant retardations is typified by the properties of rigid foams of suitable plastics materials which develop resistance more against shearing rather than compressive forces and thus the resistive collapse of such materials is more at right angles to the direction of the applied forces than along the axis of such forces. Furthermore, since the resistance in the direction of axial collapse is by progressive rigid cell collapse, such axial forces do not increase until the padding is almost fully bottomed by the penetrative force and this may well occur when only 10 percent of the material is left and is then in solid compression against some rigid backing plate, represented in FIGS. 1 and 2 at 3.

Furthermore, by making such a rigid backing plate 3 of a highly perforated or ribbed nature such as expanded or slotted metal, even the bottomed material can escape into the free space created by the holes of the perforations or between the ribs of such backing plate.

FIG. 3 shows a system in which protective devices are moved into protective location on impact.

In this system a lap bench at 11 having three padding layers 11a, b and c is free to move forward on impact by a distance of say 3 inches and its rear face 12, i.e., its part nearest the windscreen, thus squeezes the air out of the lower part of an air-inflated bag 13 by compression against a rigid bulkhead 14. The bag at 13 is preferably of non-elastic construction and is inflated like a car tyre inner tube to a low pressure such as 2 lbs. per square inch through a conventional tyre tube valve.

The compressed air due to collision compression escapes through one-way valves at 15 into an elastic bag construction 16 which is sealed integrally to the bag 13 and, being elastic, it inflates its volume and expands as shown by the dotted line at 17 and this protects the human occupant from striking the windscreen at 18. Thus, overall the effect of the human impact on the lap bench at 11 is thus to create a ball-like protection device as at 17.

Alternatively the displacement of the lap bench 11 in collision can operate a mechanical lever system which could be arranged to raise protective pads from the position 13 to the position 17, such a raising system requiring mechanical displacement magnification.

The principle involved is to use the impact energy at the human occupant to provide the displacement of protective devices into more favourable locations and clearly such a system can be applied to other parts of the vehicle.

Systems such as that shown in the drawings have a double advantage in impact protection in that they not only move protective devices into favourable locations but the extra compression distance of the lap bench motion in securing such effects also reduces impact forces on the human body at the lap bench face.

In the case where the whole of the lap bench is based on a flexible inflated bag then it will be clear that this can be used directly to replace the function of 13 of the drawings.

The purpose of the one-way valve at 15 of the drawings is to ensure that the elastic inflation from 16 to 17 is maintained for a period after stoppage of the impact forces and this also considerably reduces the reaction stiffness of the system which otherwise could produce whiplash effects. The system is self-restoring by slow back leakage through the one-way valve at 15 or through an associated permanent small aperture acting in parallel with the valve 15.

Such systems as described are entirely motivated by the collision inertia forces of the human occupants of a motor vehicle but in a modified system such forces may be used also to trigger powered systems having the same effect, such power, for example, being by compressed air or pre-compressed springs so that the impact causes a trigger switch to release such power and operate the displacement of padded or soft construction into favourable places for human protection.

When a car occupant impacts into paddings at second collision, then the formula to meet the Safe Medical Standards as to G-values is:

$S = KV^2/64G$ where S is the padding thickness in feet

V is the specified second collision velocity in feet per second

G is the Safe Medical Standard where 1G is a retardation of 32 ft. per second per second K is a constant to compensate the padding thickness for non-constant resistance and for "bottoming out"

Taking our assumed figures of G = 30 for the head and G = 50 for the rest of the body and at a second collision velocity of 15 m.p.h. (= 22 ft. per second), then the formula gives a padding thickness, when converted to inches, of:

|  | K = 1 | K = 1.5 | K = 2 | K = 3 |
|---|---|---|---|---|
| For head | 3.04 | 4.56 | 6.08 | 9.12 |
| For the rest of the body | 1.82 | 2.73 | 3.64 | 5.46 |

It will be observed that the thickness of requisite paddings escalates with increasing K value. A padding obeying Hookes Law in that resistance increases linearly with penetration, has a corresponding increasing G-value with penetration and thus has a theoretical K value of 2.0. When allowance is made for bottoming out, i.e., when the padding is fully compressed and substantially solid, the effective overall K value will be typically 3. If the padding material is of constant resistance with penetration then the G-value is similarly constant and with no bottoming out allowance there would be an ideal K-value of 1. In practice, it is possible to achieve overall K-values of down to 1.5 including bottoming out allowance, but only by the use of padding materials which essentially develop resistance by shearing forces. Materials suitable for this are rigid foamed plastics, such as phenol formaldehyde, urea formaldehyde, isocyanates and treated sodium silicates, in the density range two to ten pounds per cubic foot.

The following test measures the K-value: Take a sample of the padding material 12 inches square by 3 inches thick and place the end of a solid cylinder six inches long by 5 inches diameter on the center of the pad. Add weights to the cylinder allowing for its own weight until the padding begins to distort and plot the curve of distortion or crushing as between applied weight and penetration, until such penetration is to a depth of 2½ inches, the residual ½ inch being discounted as a bottoming out allowance. From the penetration curve calculate the peak resistance to the average resistance and this will give the K-value. The requisite thickness of padding will thus be:

$S = K. 12.V^2/64G + 0.5$ inches $= .187KV^2/G + .5$

The crushing or penetration characteristics for the different articulated zones of the body are specified as follows. This requires that a table be established as between permissible G-values and permissible area pressures for the zones, since it is the total thickness of a padding which decides the G-values, but it is the distortion characteristics as to stiffness and resistance which determine area pressures.

TABLE 3

| 1 | 2 | 3 | 4 | 5 | 6 |
|---|---|---|---|---|---|
| Body part | Half frontal area, sq. ins. | Articulated mass., lbs. | Permissible G-value | Stopping load., lbs. | Stopping pressure, lbs. sq. in. |
| Head | 20 | 15 | 30 | 450 | 22.5 |
| Trunk | 180 | 75 | 50 | 3,750 | 20.8 |
| Leg | 90 | 25 | 50 | 1,250 | 25 |

The above Table is deduced by taking the constants from Table 2 and assuming that at impact half the frontal area will be effectively involved (columns 1, 2, 3).

It assumes the maximum permissible Safe Medical Standards given at the early part of this specification (column 4). Thus the average stopping load is column 3 multiplied by column 4, whilst the average stopping pressure is column 5 divided by column 2.

Taking the value given in column 6 and relating it to the permissible G-value, a formula can be established for the three main body zones as follows. In the last column is given the formula to allow for a ± 30 percent spread and rounded to the nearest digit. The last column gives the corresponding rounded padding resistance pressures.

| Body Part | Resistance Formula lbs. sq. in. | Rounded Range Formula | Resistance Pressure Range. Lbs. sq. in. |
|---|---|---|---|
| Head | 22.5 × G/30=.75G | .5G to 1.0G | 15–30 |
| Trunk | 20.8 × G/50=.42G | .3G to .55G | 15–28 |
| Leg | 25 × G/50=.5G | .37 to .67G | 18–34 |

The last column above is the rounded range of padding resistances when using a statistical spread of ± 30 percent at the value of 30G for the head and 50G for the trunk or legs.

In the event of a total padding profile being needed to have the same constants throughout for reason of manufacturing simplicity then in view of all the values in the last column being quite close together, then we adopt the mean values giving the range 16–31.

In testing a padding to meet the above criteria, the last 20 percent of the padding for bottoming out must be discounted and then the resistance at the half deflection point of the first 80 percent is measured and thus the test is carried out as at the 40 percent deflection point.

Figure 2:
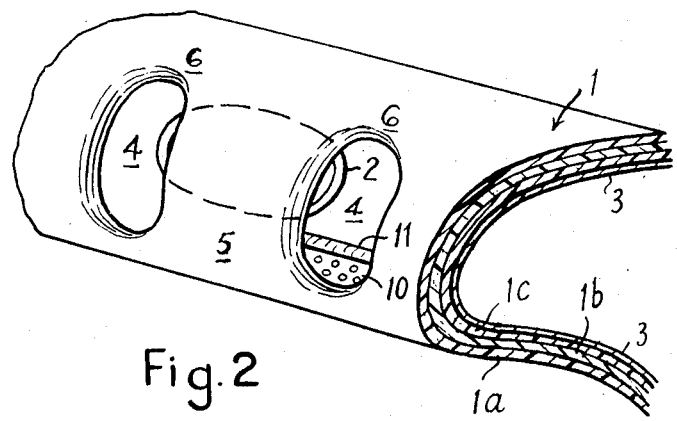
FIG. 2 shows a cut-away view of the shroud of FIG. 1.

Such a system as described in connection with FIGS. 1 and 2 has the advantage that it stops occupants at impact by paddings with the body in a natural crouching posture with all the limb joints articulating within permissible injury-free limits. However, a further improvement can be made by ensuring that the feet are the first stopping zone so that the occupants' joints, limbs and muscles operate in the natural long-jump posture in a dynamic fashion. This can be achieved in two ways: Firstly, by arranging a footrest so that, as the body moves forward at collision, the feet strike the rest before the main areas of the body strike the paddings. This causes the natural reflexes of the body to operate with two benefits in that a degree of reflex retardation is caused by stiffening of the body muscles and, secondly, the retardation into paddings occurs progressively from the feet up. The second method whereby this can be achieved is by having a footrest on a slide with a limit stop so that at first the body moves forwards being unrestricted by foot friction due to the slide operation, but when the slide comes to its stop before the main areas of the body impacts the paddings, then the foot-first stopping action operates as just described. This second system has the advantage over the first alternative in that foot friction with the floor is eliminated which otherwise might cause the body to rise into a diving posture and thus be hurled toward the windscreen.

The aforementioned foot-first stopping technique relies for its effectiveness on natural reflex action to bring muscular resistance into play relating to the long-jump posture but such may not operate if people are in collisions whilst their attention is elsewhere. Thus, the invention also proposes a knee-first stopping action by the placement of paddings on the lap bench in front of the knees, so that the knees are contacted before the main areas of the body are impacted into paddings. In this way, the knees transfer thrust forces via the hip bones to the femur and such a system can be designed to meet injury-free medical standards for femur loads and as will be described later.

A further variation as to the first part of the human body to create retardation relates to the fact that the human thighs are the largest and most resilient part of the human body and the closest large muscles to the centre of inertia of the body. There is thus also proposed an alternative technique of thigh-first stopping as follows.

In order to minimise any undue stopping pressure on the chest and upper abdomen in an accident, it is highly desirable to secure more restraint related to the pelvic girdle and the legs, particularly the thighs. This creates greater total restraint on the body from the pelvic girdle downwards and also is a further restraint to any tendency to project the vehicle occupant upwards and through the windscreen or into contact with it.

FIGS. 4 and 5 present the above problems graphically, and referring to FIG. 4, the upper parts of the occupant's thighs 19 must be approximately horizontal as an extension of the horizontal aspect of the seat 20, and the padding 21, with its three layers 21a, b and c, above the thighs must also be substantially horizontal at 22 to give free clearance to the thighs. Indeed by definition, padding must be parallel to the legs and this means that on forward impact the human body in the leg area would have to travel a considerable distance forward until the tangent of the slightly downward leg angle caused the padding to contact the upper face of the thighs.

FIG. 5 schematically shows a further proposal for meeting these considerations, wherein the car seat 20 is on slide means or runners 23 secured to the floor, and is inclined as shown at the interface 24 so that on forward collision the inertia of the seat in sympathy with the inertia of the forward movement of the human body causes the seat to rise by the tangent of the angle so that the thighs are forced into contact with the lower face of the padding as shown in the dotted lines at 19a and 20a representing the impact position of the thighs and seat respectively.

In this way the human body can be firmly wedged and restrained by the pressure between the seat and the lower part of the cushioning system.

It is desirable that the occupant is so held trapped in the position shown in FIG. 5 against any secondary later collision or roll-over and thus the rising wedge seat 20 is preferably provided with means to lock the seat in its highest position reached in collision. This is diagrammatically exemplified by ratchet 25 and pawl 26 held by tension spring 27. Clearly any equivalent arrangement can be used that operates to the same effect. Appropriate devices are too numerous to mention and are well known to those skilled in the art. Means must be provided to release the occupant after the collision has ceased.

The system can also be used as a means of adjustment of thigh clearance when in the normal situation so that the thighs of different people are adjusted to have a relatively constant clearance relationship to the underface of the paddings. This would involve raising the seat on its wedge base to a predetermined initial position.

In one convenient embodiment, the back 28 of the seat is in the form of an inflatable bag having an inflation valve 29 of any desired kind and a slow-escape orifice 30 normally closed by a plug 31 on a rear support 32. When the occupant moves forwards on collision, as shown in FIG. 5, the plug 31 is removed from the orifice 30 and the contained air slowly leaks out of the bag 28 to allow the occupant to be released from his held position. The bag itself is retained in relation to the support 24 by straps 33. Plug 31 may be separate from the back and secured thereto by a cord (not shown). A similar construction could be embodied in the seat itself.

Provision should be made also for the occupant's feet and a similar wedge action slide means is provided, similarly to the seat, and comprising a foot rest 34 mounted on a slide means or runners 35 secured to the floor. If desired, pawl and ratchet means 36, 37 and 38 may be provided to lock the footrest in the forward position, similarly to the locking device for the seat.

Thus, the schematic arrangement of FIG. 5 utilises this principle of "feet-first" shock absorbence natural to the human body related to gravitational fields in the case of the occupant in a motor car. The first essential is to provide a footrest so that on collision impact this is the first device to begin to stop the human body and thereafter so to arrange the geometry of the lap bench paddings so that the human body contacts them in the order of knees, thighs, hips, abdomen, chest and head. By this means of progressive stopping by paddings from the feet first, one simulates an impact progression the same or similar to the natural ability of a human being to resist shock when falling in a gravitational field or "jumping." The arrangement thus utilises the inherently safe jumping posture of the human body.

By this means the body posture is exactly the same as before the collision as when it contacts the paddings after collision. The importance of this is that the total system collaborates in a completely controlled geometry so that the designer of such a system knows exactly where the human body will contact the cushioning system and this enables the design to be refined in detail as to the cushioning characteristics appropriate to the various parts of the human body.

The total effect of this natural progression of impact and restraint is that stopping forces become progressively diminished along the progression so that the forward impact velocity of the upper parts of the human body, particularly the chest and the head are far lower than would otherwise be the case and since the human head is the most vulnerable part of the body, the risk of injury to the head is correspondingly reduced.

The system as thus far described is generally suitable for passenger occupants, but the driver of a vehicle has special problems in that the steering means must not invalidate the safety integrity of the padded system. In order to ensure protection to the driver, two alternative methods of steering are proposed as follows.

The invention firstly envisages replacing the conventional steering wheel of a motor vehicle by a system of pulleys or the like interconnected by a continuous driving member such as a belt, chain, rope or the like means, one of said pulleys being mounted on the steering column or other steering-torque transmission member so that the rotation thereof will rotate said column or other member to steer the vehicle.

In a preferred arrangement, a system of three pulleys is employed, around which engages a continuous belt made from flexible material and in such a manner that the vehicle can be steered by gripping the run of the belt between any adjacent two of the pulleys and moving it from side to side, thus to rotate the steering column or other member.

In order to improve the drive ratio between the pulleys and the belt, the pulley-engaging face of the belt may be toothed or provided with similar projections and the pulleys are also toothed or provided with recesses to engage with the teeth or other projections of the belt.

A further preferred feature is that at least one of the pulleys close to the driver is arranged on a spring-loaded jockey arm so that on impact due to an accident, that pulley will be moved by the impact, e.g. of the driver's body, so as to lessen the possibility of his becoming injured.

The lap bench in which the steering device is accommodated is recessed along a front edge thereof to accommodate the run of the belt that is intended to be gripped by the driver.

In FIG. 6 there is shown a steering device comprising a main drive pulley 39 connected to a steering column 40 and the forward pulleys in front of the driver are shown at 41 and 42. A continuous internally toothed belt 43 passes around the three pulleys which are shown toothed for engagement with the teeth of the belt.

The pulley 41 is shown in FIG. 7 with a schematic representation of a tension spring jockey arrangement at 44 for tensioning the belt 43 and make the device more secure and provide a means whereby the arrangement can "give" on impact.

FIG. 8 shows the disposition of the arrangement in relation to the lap bench 45 which is recessed at 49. The view is from the left hand side and the bench 45 is shown in section.

If desired, the pulley 39 may be a plain spiral pulley and the belt smooth or of trapezoidal section.

The belt 43 may be of rubberised canvas or of plastics and may be reinforced by a core of steel or other cables. Alternatively, the belt could be basically a flexible steel cable or chain around which are moulded plastics hand grips for the driver.

However, if it is desired to use a more conventional steering wheel, the invention secondly and alternatively proposes that a central pad for chest impact protection in the event of human collision be fixed in the axis of the steering column whilst a steering wheel rim is mounted in a flexible manner related to this central pad so that on impact the steering rim is depressed against spring pressure to a lower level than the padding and is thus substantially non-injurious.

Referring to FIGS. 9 and 10 of the drawings, respectively showing a plan view and a side view of the device, a central pad 47 is fixed to a metal plate 46 of a rigid nature. A steering rim 49 is fixed through three or more pillars 50 to a spring steel spider 51 which at its central area 52 is joined with both the centre pad 47 and the plate 46 to the steering column 53. Thus any axial pressure on the steering rim 49 causes a downwards deflection of the spider 51 whilst leaving the central pad 46 unaffected.

In an equivalent interpretation all the functions performed by the elements 49, 50, 51 can be performed by a single deformable plastic moulding with or without metal reinforcement, the latter for example to stiffen the rim relative to the other functions of spring-like nature.

The same overall principles can be embodied in a rigid steering wheel assembly whose central boss below the central pad rides on splines on the steering column against a restoring spring pressure so that on impact the steering rim can move axially downwards against this spring pressure, such restoring spring being conveniently of a coil spring nature whose axis is also that of the steering column axis.

Alternatively, the system can use a spring-loaded ball or equivalent which normally holds the steering wheel rim in the normal driving position but which, above a certain axial pressure, allows the boss of the rim to slide freely downwards in the axial direction.

When using the design shown in FIGS. 9 and 10, it is desirable that either the pillars 50 or the spider 51 have a degree of radial resilience to accommodate without undue resistance, the axial displacement otherwise creating resistive stresses in the area 52.

This need can equally be met by making the arms of the spider 51 at an angle to the radial, for example, by making them of a flexible spiral nature.

The examples given are merely illustrative of the general principle.

A conventional horn button can be accommodated at the centre of the steering pad provided that means are taken to permit this button easily to collapse against a spring pressure in the direction of the steering column axis on pressure of human bodily impact.

In one form, the spider 51 dan be rigid whilst the pillars 50 can be of telescopic springs or of coil springs with central guide rods mating with bosses attached to the ends of the spider.

FIG. 11 of the accompanying drawings shows a cross-section through a typical arrangement of the steering wheel when used in conjunction with the padded lap bench arrangement 54 hereinabove described. The three layers are shown at 54a, b and c.

In paddings as heretofore described, designed to minimise G-values by minimising K-values, it is further essential that such paddings also have energy-dissipating properties so that at second collision impact the human body does not bounce back from such paddings after compression of an elastic nature. This requirement can be specified by the following test which is designed to test that paddings shall not have a coefficient of restitution of greater than .05. Take a standard headform as represented by a sphere of 6½ inches diameter and weighing 15 lbs. and drop this onto a 12 inch by 12 inch by 3 inch thick sample of the padding from a height of 40 inches. The headform should not bounce back after impact by more than 2 inches and as measured by high-speed cinematography or other convenient means.

Injury criteria to the human body at second collision impact can only partly be specified in terms of G-values as heretofore described and, in addition, it is necessary to give consideration both to impact pressures per unit area and also total loads. It will be clear that, if a given total impact load is spread over a greater stopping area, the impact pressures will be correspondingly reduced. However, there are two phases of desirable load spreading: the first is concerned with very small and vulnerable zones of the body and the second with the larger areas of the body.

The first phase of load spreading is specific to those parts of the body having small projections, such as the nose, the kneecaps and the shin bones, whilst at the same time, one must take special consideration to the bridging over of the eyes. This invention is based on "worst case" philosophy, wherefore it is only necessary to deal with the nose and the eyes and measures which will be protective will, according to medical evicence, be protective with a margin for kneecaps and shin bones.

Firstly, considering padding to protect against damage from the eyeball which from Table 1 above can stand a load of five pounds. The eyeball can be considered as a sphere 1 inch in diameter whose forward tip lies ¼ inch below a surrounding body socket structure of approximately 2 inches diameter. Thus, providing padding can bridge this 2-inch diameter bone structure without causing more than 5 lbs. load on the eye, then the eye is protected. The operational condition relevant is that deducible from Table 1 above and according to the formula:

$F = MG$ where F would be force on the head at second collision

M is the head mass at 15 lbs.

G is the Safe Medical Standard which we take at 30.

thus $F = 15 \times 30 = 450$ lbs.

As a standard test for padding material capable of protecting the eye by bridging over to the eye socket protective bone structure, take a standard headform consisting of a 6½ inch diameter solid sphere and drill through it a 2-inch diameter hole. Fit a piston into the hole having an end simulating an eyeball by a hemisphere of one-inch diameter located centrally and fitted with a stop so that the tip of the hemisphere cannot move closer than one-fourth of an inch below the surround 2-inch hole on the main headform surface. Subject the headform to pressure into the padding with the hemisphere centrally to a load of 450 lbs. and measure the load required on the end of the piston opposite to the hemisphere to bring the latter back to its recessed stop. This load should not be greater than 5 pounds.

The second requirement for load spreading is to protect the nose as the worst case. Again, we assume the total head load at impact will be 450 lbs. and that the nose can take a load of 50 lbs. per square inch (see Table 1) and that the effective frontal area of the nose is one square inch. Again, a specific test is formulated.

Take a solid headform consisting of a 6½ inch diameter sphere and drill right through to take a piston of 1.275 inches diameter having a hemispherical end simulating the projecting part of the nose having an area of one square inch. Fit the piston with a stop so that it can project up to 0.75 inch beyond the headform which should be loaded generally with $450 - 50 = 400$ lbs. and pressing into the padding with the hemisphere centrally. Load the piston from the back end with 50 lbs. (making the total load 450 lbs.) and, if the padding is satisfactory, then the piston will return to its stop. If more than 50 lbs. is required to bring the piston to its stop, then the padding is unsatisfactory.

From the above, and considering both requirements, experimentation shows that typical resilient plastics foams and the like, which can meet the nose test, will normally meet the eyeball test, and it will be appreciated that the nose test requires a soft padding and the eye test a hard padding but, in practice, the softness for the nose test is harder than the hardness required for the eye test. Accordingly, a suitable padding can be specified in terms of the nose test alone. If this test is examined, it will be seen that the nose must readily penetrate into padding to a depth of 0.75 inches at a load of not more than 50 lbs. over one square inch but that after this point the cheek bones begin to take the total load. In practice, and over a wide range of paddings, it has been found that the layer or function must be between 1½ inches thick and that the maximum stiffness must not exceed 50 lbs. per square inch per inch. It is assumed that Hookes Law holds good for penetration and thus the padding must not exceed a resistance of 25 lbs. per square inch at a compression of ½ inch, such a test to be conducted by load from the end of a 5-inch diameter solid cylinder. It will be appreciated that the application of such outer padding function should at least apply to that part of a total padding profile which could likely be contacted by the head in a second collision impact and particularly to that part of the padding profile between the rearmost part of the lap bench and the windscreen.

When one considers the structure of the human body where long bones are involved, particularly the lower limbs, then a special aspect of load spreading is required which ensures that at padding impact such bones are not placed in bending stress with high consequent tension stress in the bones which are their weakest resistive mode to fracture. It can be shown typically that the main leg bones have about 100 times greater strength against fracture if they are in true longitudinal or transverse compression without bending moments. Dealing with the latter as "the worst case" according to medical evidence, the requirement is that the curvature of paddings against such bones shall not be such as to leave part of the bone structure unsupported by padding. The relevant formula considering either lower leg or thighbone as a chord against a padding radius is:

$$d(2R-d) = (½L)^2$$

where R is radius of padding
$d$ is depth to padding from a theoretical chord of leg bone length L.

Approximately solving by graphical method one establishes for typical leg bones 14 inches long:

TABLE 4

| Padding radius inches | d | T |
|---|---|---|
| 10 | 3 | 4 |
| 20 | 1¼ | 2¼ |
| 30 | ¾ | 1¾ |

The value T is 1 inch greater than the value $d$ assuming that 1 inch of padding is a minimum to take up uneven shape of bones in profile and thus these values of T establish the approximate minimum padding depths to avoid bending moments. Since the need for extra padding drops rapidly with increasing radius, we adopt a value of 30 inches as the desirable minimum radius for paddings opposite either the thigh or shin bone.

With a system designed for "knee-first" stopping as earlier described in terms of a permissible mode using the long-jump posture, specific characteristics must be described which will meet the criteria of Table 2 in that knee load must not exceed 100 lbs. per square inch over typically 10 square inches, and load on each femur must not exceed 1,400 lbs.

Taking first the knee load, this must not exceed 10 × 100, i.e., 1,000 lbs. on each knee and this will likely have associated with it the total single thigh mass and one-quarter the trunk mass. From Table 2 this total mass is 34 lbs. Thus, the permissible knee retardation is 1000/34 = 29G. The load on the femur at this retardation will be related to the quarter trunk mass only and will thus be 29 × 19 = 550 lbs. which is well below the permissible level of 1,400 lbs.

In order to reduce the knee retardation to 29G the thickness of padding is expressed by $.187KV^2/G + .5$ and taking a best found value of K at 1.3 then the thickness if 6.3 inches. This value is rounded to the range 5 to 7 inches and the provision for the outer layer of softer padding for the "nose and eye" technique is added, which is also applicable to the kneecap and there is thus established a typical overall padding range of 6 to 8 inches in thickness.

It will be appreciated in the general shaping of the total padding profile that it can be modified to suit transverse human body contours as appropriate and typically that the rearmost projecting section of the profile could be given a concave depression of perhaps 12 inch radius to a chord depth of perhaps three inches to secure greater load spreading area when impacted by abdomen or chest.

In padding systems of the types heretofore described, our calculations and specifications are based on Safe Medical Standards, primarily specified in terms of G-values. Such G-values must relate to actual second collision velocities into paddings and in cases where only primary G-values have been specified or when other restraint methods are simultaneously incorporated, then allowance must be made for such variations.

The invention also provides units for adding to existing vehicle upholstery so as to increase the safety factores within the terms expressed above. In particular, some of these units are for the protection of children.

Figures 12, 13:
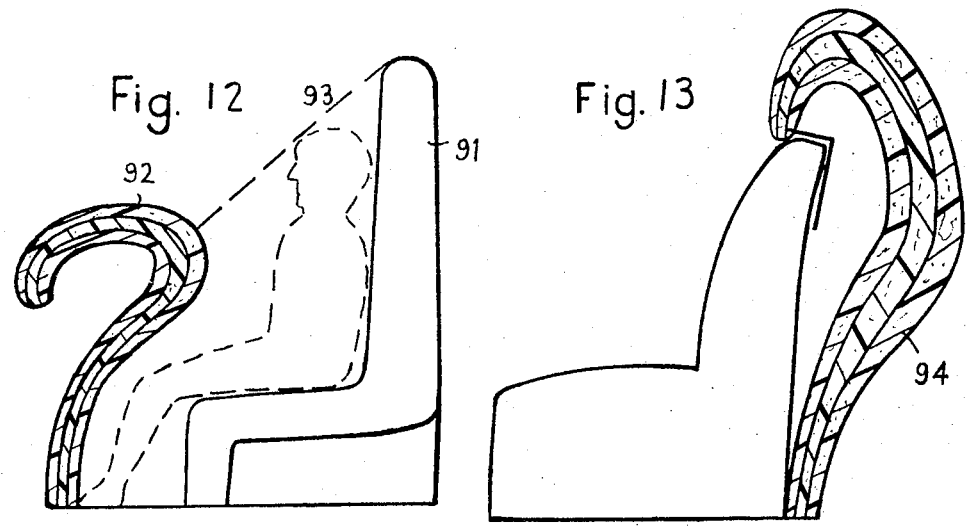
Figure 14:
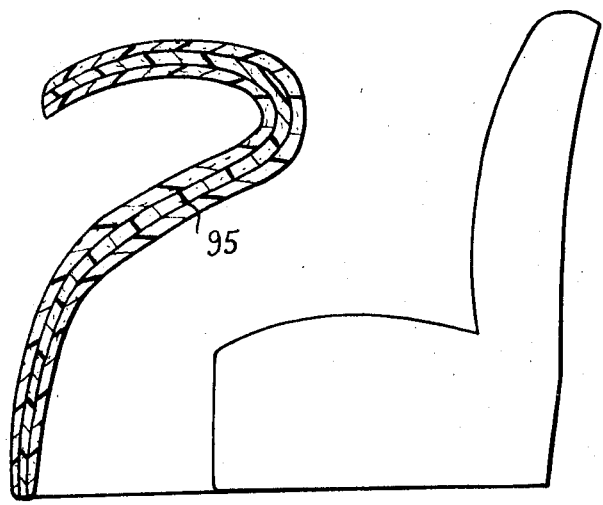
Figure 15:
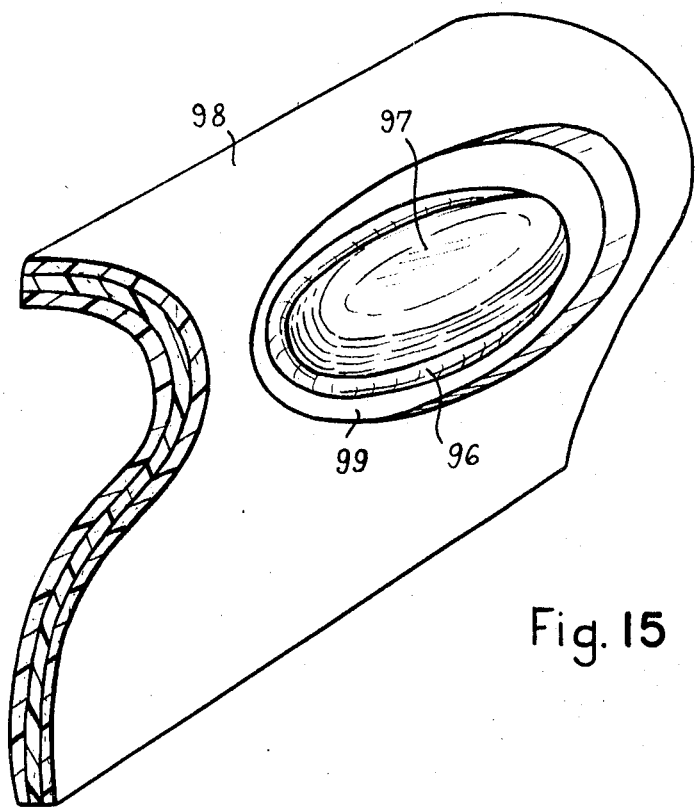

FIG. 12 shows a cross-section through a unit for protecting a child in the rear seat of a vehicle; FIG. 13 shows a cross-section through a buffering cushion adapted to be fitted to the back of the front seat of a motor vehicle for protection of a rear passenger; FIG. 14 shows a buffering unit adapted to be fitted to the dash or similar part in the front compartment of a motor vehicle on the passenger side; FIG. 15 shows a view of a buffering unit adapted to be fitted around the steering wheel of a motor vehicle.

Referring now particularly to these Figures, the unit of FIG. 12 provides a rear seat for a motor vehicle, the back rest 91 of which is extended to a height above the level of a child's head (the child's figure being indicated in dotted lines in the drawing), and is so shaped and disposed as to accommodate what is referred to as whiplash of the child's body in the event of a collision at the rear of the vehicle, and in front of the child there is provided a bench 92 which is made in the form of a cushioned buffer or bench for fitting in position behind the front seat of the vehicle and is generally of the multi-layer construction referred to above. Thus, on forward collision, the child is virtually wrapped around the bench 92 which, however, has a high degree of capability to spread the loads of the collision forces. Preferably, the cushioned buffer and the seat portion are formed as a unit with side members schematically illustrated at 93 which are raised to any desired degree but, preferably, to the child's head level. The whole unit is lined with foamed plastics material as previously described and may be firmly attached to the vehicle by appropriate fittings such as bolts or straps. These can take any form known in the art and have therefore not been illustrated. Preferably, the front bench 92 has such dimensions and is so constructed that it can be wedged against the rear of the front seats to provide both stability and extra cushioning, since it has been found that a separate cushion wedged in this position is an excellent solution to the problem of protection of a small child. Experiments have shown on a statistical analysis of 50,000 road accidents that young children are safer in a collision if they are seated on the rear seat without the use of safety belts, because these belts can cause chest injuries, since it is comparatively easy to fracture the weak rib cage of a child, and can inflict head injuries, because a child's head is comparatively heavy compared to the strength of his neck. Such a unit is a good solution to the problem since the child will fall against padding in the event of a collision. A loose lap strap may be worn to prevent ejection after original collision. If desired, the back of the unit as fitted to the rear seat as above described may be omitted if the normal back of the seat has a sufficient height to function in the manner described above.

FIG. 13 shows a unit which acts as a front seat cushion form and consists of a section that is approximately the shape of a question mark having about 3 inches thickness of padding over a former 94 and this can be attached to the front seat in any desired fashion as, for example, by clips, straps or tapes or by a sheath that embraces the whole of the back of the front seat. These attachment means have not been illustrated however. This unit also will provide whiplash protection for the front seat passengers at head level, as well as forward protection for the rear passengers, owing to the disposition of the front part of the cushion above the back of the front seat. Thus, an existing vehicle can thereby readily be modified in a simple fashion but in such a manner as to include the safety provisions referred to above.

FIG. 14 shows an arrangement for protection of the passenger in the front seat of a conventional vehicle and comprises a cushioning buffer 95 constructed as hereinabove described and this unit can be semi-permanently or permanently fixed to the dash or other convenient part of the vehicle by solid fixings, such as screws, or by temporary fixings, such as straps or the like (not illustrated).

The driver can be protected by a buffering arrangement very similar to that shown in FIG. 14 but with a suitable aperture formed therein for accommodation of a steering wheel similar to the one shown in FIGS. 9, 10 and 11.

Alternatively, as shown in FIG. 15, a conventional steering wheel 96 which is preferably of the collapsible type now coming into general use in motor vehicles, is located in the usual fashion but is provided with a substantial padded portion 97 to project well above the rim of the steering wheel and an aperture 99 is cut out of a cushioned buffer shown at 98 so as to permit all-round access to the steering wheel. In this way, the padding 97 on the steering wheel and the buffer 98 combine together to give the driver substantial protection in the event of a collision.

I claim:

1. In a motor vehicle having a seat for supporting an occupant, the improvement which comprises resilient paddings in front of said seat, which paddings are so shaped as to conform to the lateral profile of a human occupant supported by said seat in the natural long-jump posture, said paddings having a relatively horizontal top area positioned to be contacted by the head, face and upper chest, a central rounded rearwardly-projecting area positioned to be contacted by the lower chest and abdomen, a first underneath substantially horizontal area positioned to be contacted by the greater part of the length of the thighs, and a second underneath area sloping downwardly and forwardly at a distinct angle to said first underneath area and shaped and positioned to be contacted by the greater part of the length of the lower legs of said occupant when said occupant is thrown forward from said seat toward said padding with said legs in said long-jump posture.

2. A motor vehicle as claimed in claim 1, wherein the dimension of said relatively horizontal top area, rearwardly from the vehicle windshield, is longer than the upper torso and head of a human being.

3. A motor vehicle as claimed in claim 1 in which said dimension of said substantially horizontal top area in front of the occupant is 30 inches.

4. A motor vehicle as claimed in claim 1 comprising a fixed footrest so positioned that the occupant's feet make contact with it before the main part of the body impacts said paddings.

5. A motor vehicle as claimed in claim 1 comprising a sliding footrest with a limit stop which prevents the occupant's body from rising upward due to foot friction but secures foot-first retardation action.

6. A motor vehicle as claimed in claim 1, wherein the coefficient of restitution of said paddings is not greater than .05.

7. A motor vehicle as claimed in claim 1 wherein at least the upper part of said paddings have a relatively stiff resilient inner position and a distinct resilient softer outer portion such that when struck by an occupant's head at the Safe Medical Standard established for the head in terms of maximum G-values, the load on the eyeball, apart from inertial forces from the eyeball, does not exceed five pounds and in which the load on the nose does not exceed 50 pounds.

8. A motor vehicle as claimed in claim 1 wherein at least the upper part of said paddings have a relatively stiff resilient inner portion and a distinct resilient softer outer portion consisting of a zone between 1 inch and 1½ inches deep from the outer surface and characterized in that its resistance to compression is not more thatn 25 pounds per square inch when measured at ½ inch compression over an area of approximately 20 square inches.

9. A motor vehicle as claimed in claim 1, wherein the paddings have radius of curvature of the for contacting either the lower or upper leg of not less than 30 inches.

10. A motor vehicle as claimed in claim 1, wherein the zone of the paddings immediately opposite the occupant's abdomen and chest is concave to secure greater load spreading over a greater area of the body and to relieve the pressure on the frontal part of the abdomen.

11. A motor vehicle as claimed in claim 1, wherein said paddings are of a multi-functional construction to divide them into at least two zone, one outer zone constituting a critical initial zone to absorb the energy of sharp impact, and a second inner zone to absorb any residual energy dissipated.

12. A motor vehicle as claimed in claim 1, wherein the paddings incorporate a lap bench which includes an underlying former that itself provides further energy-absorbing and distorting characteristics.

13. A motor vehicle as claimed in claim 12, wherein the paddings incorporate a lap bench which is of construction similar to its padded surface, its main volume being of foamed plastics construction having energy-absorbing properties.

14. A motor vehicle as claimed in claim 12, wherein the paddings lap bench comprises a main volume and a surface portion, the main volume and the surface portion being of distinctly different energy-absorbing materials.

15. A motor vehicle as claimed in claim 14, wherein said main volume comprises a former of sheet material that allows a predetermined amount of distortion on impact, upon which former are mounted surface padding materials.

16. A motor vehicle as claimed in claim 15, wherein said former is made of expanded metal.

17. A motor vehicle as claimed in claim 26, wherein said former is made of slotted metal.

18. A motor vehicle as claimed in claim 15, comprising a second more rigid backing former against which said first mentioned former is distortable.

19. A motor vehicle as claimed in claim 18, wherein said lap bench comprises a surface layer of padding materials behind which is located a bag containing a compressible material behind which is supported by a rigid backing former.

20. A motor vehicle as claimed in claim 2 comprising a footrest, in which the padding is geometrically and kinetically arranged to take the impact of an occupant thrown forwardly against it progressively from the feet upwards, viz: in the order of: feet, lower legs, thighs, pelvis, abdomen, chest and head.

21. A motor vehicle as claimed in claim 1 comprising, an add-on unit consisting of a seat having a back extended upwardly beyond a child's head level and a cushioned buffer or bench for location in front of the child.

22. A motor vehicle as claimed in claim 1 including, means for protecting the rear passenger of a motor vehicle which comprises a cushion or buffer adapted to be fitted to the rear of the front seat or seats of a vehicle to surround the whole of the back thereof, and having a rearwardly projecting padded portion adapted to receive and cushion the body of a rear passenger in the event of a collision.

23. A motor vehicle as claimed in claim 1 comprising, a unitary former assembly with padded coverings adapted to be fitted to the dash or other similar part in front of the front passenger of the motor vehicle, but otherwise constructed to fulfil a cushion-buffer effect.

24. A motor vehicle as claimed in claim 1 comprising a cushion or buffering unit fixed to the vehicle steering wheel.

25. A motor vehicle as claimed in claim 2 wherein said occupant's seat is mounted on slide means for movement between a normal rearward location and a forward location in which an occupant of said seat is brought into contact with said paddings in a controlled position, said slide means sloping upward from the rear toward the front of the seat so that inertia retains said seat in said normal location under normal conditions but causes said seat to slide forward into said forward position when subjected to a predetermined load in the event of gross vehicle retardation.

26. A motor vehicle as claimed in claim 25 which comprises releasable means for automatically retaining said seat in said forward position so as to hold a person in said seat against said padding once said seat has been thrown forward, in the event of any secondary collision or roll-over.

* * * * *